United States Patent [19]

Berry

[11] Patent Number: 4,464,808
[45] Date of Patent: Aug. 14, 1984

[54] ANTI-LIFT DEVICE FOR WINDSHIELD WIPERS

[76] Inventor: Steven R. Berry, 10601 Juniper Glen, Houston, Tex. 77041

[21] Appl. No.: 450,518

[22] Filed: Dec. 17, 1982

[51] Int. Cl.³ .............................................. B60S 1/32
[52] U.S. Cl. ................................ 15/250.2; 15/250.35; 15/250.42
[58] Field of Search .............. 15/250.2, 250.42, 250.35

[56] References Cited

U.S. PATENT DOCUMENTS 3,685,086  8/1972  Frohlich .............................. 15/250.2

FOREIGN PATENT DOCUMENTS 1332602  10/1973  United Kingdom ............... 15/250.2

*Primary Examiner*—Peter Feldman
*Attorney, Agent, or Firm*—Neal J. Mosely

[57] ABSTRACT

An anti-lift device for windshield wipers is disclosed having a novel construction. More particularly the anti-lift device comprises a linear series of generally rectangular fin members having a dihedral shape. Each dihedral shaped fin has a lower leading edge integral with a rectangular base member and projects upwardly and rearwardly therefrom to terminate at a trailing edge. A perpendicular reinforcing web adjoins the backside of the dihedral fin and the base member. The base member contains a central longitudinal slot and "L" shaped clip for releasably attaching the anti-life device to a conventional windshield wiper arm. When installed on a windshield wiper arm, the aerodynamic forces acting upon the device will press the wiper arm and blade firmly to the windshield to prevent the blade from acting as an airfoil and lifting from the surface of the windshield.

8 Claims, 5 Drawing Figures

ANTI-LIFT DEVICE FOR WINDSHIELD WIPERS

BACKGROUND OF THE INVENTION

1. Field of the Invention

This invention relates to anti-lift devices and more particularly to an anti-lift device having novel construction for use on conventional windshield wiper assemblies.

2. Brief Description of the Prior Art

It is a frequent occurance of conventional windshield wipers to lift aerodynamically from the windshield surface and particularly during heavy winds and rain. This is due in part to the fact that the windshield wiper blade takes on the characteristics of an airfoil when moving through the air at a high velocity. Other factors which contribute to this characteristic are the lighter weight materials used in the wiper blade arms, the increased fin area of the blade due to larger windshields, the loss of adhesion and aquaplaning when the windshield is wet, and the aerodynamic slope and shape of the windshield of modern automobiles.

There has not been a practical inexpensive means available in the United States for overcoming the lift characteristic which can be easily attached to existing conventional windshield wiper blade assemblies. The inventor believes that anti-lift devices for windshield wipers may be sold in other countries but are not sold in the United States and are not patented or described in the literature.

SUMMARY OF THE INVENTION

It is therefore an object of the present invention to provide an anti-lift device for windshield wipers having a novel construction.

Another object of this invention is to provide an anti-lift device which is inexpensive to manufacture and can easily be installed on existing conventional windshield wiper assemblies.

Another object of this invention is to provide an anti-lift device which will prevent existing conventional wipers from lifting from the windshield surface at any speed and/or during heavy winds or rain.

Other objects of the invention will become apparent from time to time throughout the specification and claims as hereinafter related.

The above noted objects and other objects of the invention are accomplished by an anti-lift device for windhshield wipers comprising a linear series of generally rectangular fin members having a dihedral shape. Each dihedral shaped fin having a lower leading edge integral with a rectangular base member and projecting upwardly and rearwardly therefrom to terminate at a trailing edge. A perpendicular reinforcing web adjoins the backside of the dihedral fin and the base member. The base member contains a central longitudinal slot and "L" shaped clip for releasably attaching the anti-lift device to a conventional windshield wiper blade arm. When installed on a windshield wiper, the aerodynamic forces acting upon the device will press the wiper blade firmly to the windshield and prevent the blade from acting as an airfoil and lifting from the surface of the windshield.

DESCRIPTION OF THE PREFERRED EMBODIMENT

Figure 1:
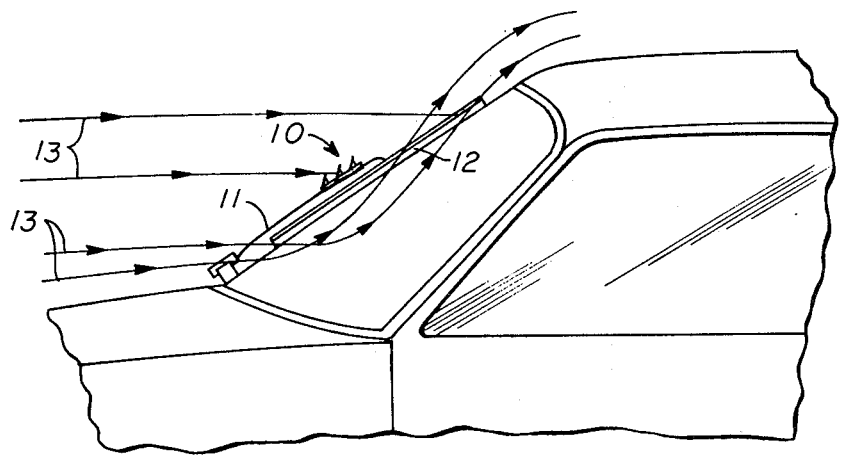
FIG. 1 is a side elevational illustration of the anti-lift device installed on a conventional windshield wiper arm.
Figure 2:
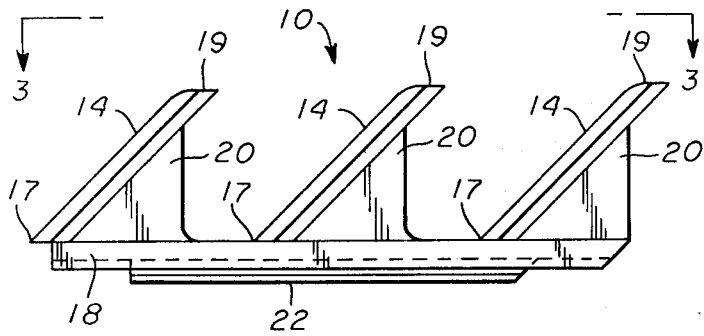
FIG. 2 is a side elevational view of the preferred embodiment of the anti-lift device in accordance with the present invention.
Figure 3:
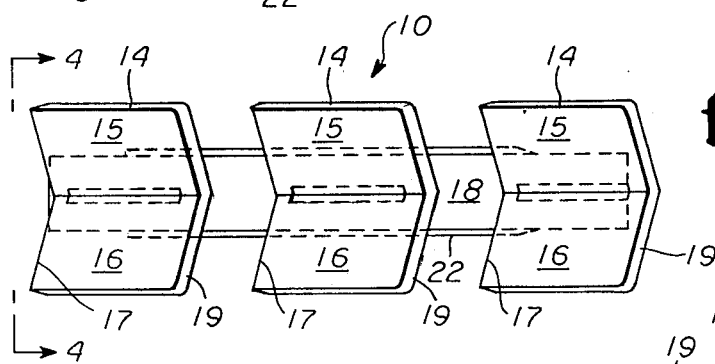
FIG. 3 is a top plan view of the anti-lift device in accordance with the present invention taken along lines 3—3 of FIG. 2.

Referring to the drawings by numerals of reference, and more particularly to FIG. 1, there is shown a preferred anti-lift device designated generally as 10. Anti-lift device 10 is shown installed on a conventional windshield wiper arm 11 having a wiper blade 12. Lines 13 represent the flow of air acting upon the windshield wiper assembly.

Referring now to FIGS. 2-5, the anti-lift device 10 comprises a series of linearly disposed fin members 14. Each fin member 14 is formed of generally rectangular left and right flat surfaces 15 and 16 respectively. Left and right flat surfaces 15 and 16 extend angularly outwardly from their intersection to form a dihedral shape.

Each dihedral shaped fin member 14 has a lower leading edge 17 integral with a rectangular base 18 and projects upwardly and rearwardly therefrom to terminate at a trailing edge 19. A thin perpendicular reinforcing web 20 adjoins the backside of each dihedral fin 14 and the base 18 to give support and stability to the fins 14.

Figure 4:
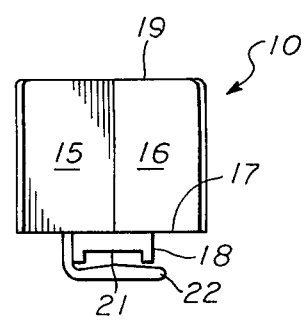
FIG. 4 is a front elevational view of the anti-lift device taken along lines 4—4 of FIG. 3.
Figure 5:
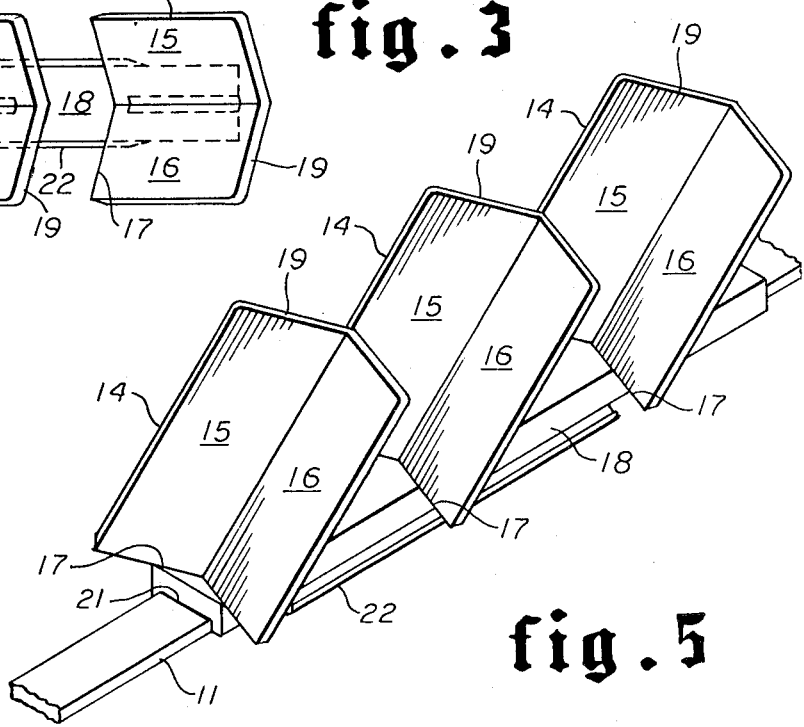
FIG. 5 is an isometric view of the anti-lift device installed on a windshield wiper arm.

The base 18 contains a central longitudinal slot 21 of sufficient width and length to receive a conventional windshield wiper arm 11. The base 18 further comprises a generally "L" shaped spring clip 22 adapted to releasably attach and securely hold the anti-lift device 10 on the windshield wiper arm 11 (FIGS. 4 and 5).

When installed on a conventional windshield wiper arm 11, the aerodynamic forces acting upon the upwardly extending dihedral fin surfaces 14 will create a "spoiler" effect and press the windshield wiper arm 11 and blade 12 firmly to the windshield surface to prevent the blade 12 from acting as an airfoil and "lifting" from the surface of the windshield.

While this invention has been described fully and completely with special emphasis upon a preferred embodiment, it should be understood that within the scope of the appended claims the invention may be practiced otherwise than is specifically described herein.

I claim:

1. An anti-lift device for windshield wipers comprising;
   a base member,
   a series of fin members linearly disposed thereon and extending at an obtuse angle therefrom in substantially parallel relation,
   each of said fin members being formed of two sections comprising flat surfaces intersecting and extending at an obtuse angle relative to each other and outwardly from the line of intersection to form an obtuse dihedral shaped fin surface, a perpendicular reinforcing web interconnecting the rear of each of said fin members, at the base of the dihedral angle, and said base member to provide support and stability to said fin members, and means on said base member for releasably attaching said device to a windshield wiper arm.

2. A device according to claim 1 in which, each of said dihedral shaped fin surfaces has a lower leading edge integral with said base and projects upwardly and rearwardly at an obtuse angle therefrom to terminate at a trailing edge.

3. A device according to claim 1 in which, said base is rectangular in cross-section and elongated and contains a central longitudinal slot adapted to receive a conventional windshield wiper arm.

4. A device according to claim 1 in which, said releasably attaching means is a spring clip integral with said base and adapted to grip said windshield wiper arm.

5. A device according to claim 1 in which, each of said dihedral shaped fin surfaces has a lower leading edge integral with said base and projects upwardly and rearwardly at an obtuse angle therefrom to terminate at a trailing edge, and said base is rectangular in cross-section and elongated and contains a central longitudinal slot adapted to receive a conventional windshield wiper arm.

6. A device according to claim 1 in which, each of said dihedral shaped fin surfaces has a lower leading edge integral with said base and projects upwardly and rearwardly therefrom to terminate at a trailing edge, and said releasably attaching means is a spring clip integral with said base and adapted to grip said windshield wiper arm.

7. A device according to claim 1 in which, said base is rectangular in cross-section and elongated and contains a central longitudinal slot adapted to receive a conventional windshield wiper arm, and said releasably attaching means is a spring clip adapted to grip said windshield wiper arm.

8. A device according to claim 1 in which, each of said dihedral shaped fin surfaces has a lower leading edge integral with said base and projects upwardly and rearwardly therefrom to terminate at a trailing edge, said base is rectangular in cross-section and elongated and contains a central longitudinal slot adapted to receive a conventional windshield wiper arm, and said releasably attaching means is a spring clip integral wit said base and adapted to grip said windshield wiper arm.

* * * * *